(12) United States Patent
Tiernay et al.

(10) Patent No.: US 7,817,015 B1
(45) Date of Patent: Oct. 19, 2010

(54) FLOATING THRESHOLD FOR DATA DETECTION IN A RFID TAG

(75) Inventors: Robert W. Tiernay, Alburquerque, NM (US); Filip Weytjens, Alburquerque, NM (US)

(73) Assignee: TC License Ltd., Hummelstown, PA (US)

( * ) Notice: Subject to any disclaimer, the term of this patent is extended or adjusted under 35 U.S.C. 154(b) by 756 days.

(21) Appl. No.: 11/238,118

(22) Filed: Sep. 29, 2005

(51) Int. Cl.
*H04Q 5/22* (2006.01)
(52) U.S. Cl. ............... 340/10.4; 455/127.2; 340/572.1
(58) Field of Classification Search ............... 340/10.4, 340/10.2, 572.1, 10.1; 455/63.1, 41.1, 41.2
See application file for complete search history.

(56) References Cited

U.S. PATENT DOCUMENTS

| | | | |
|---|---|---|---|
| 4,779,077 A * | 10/1988 | Lichtblau .................. | 340/572.4 |
| 4,783,658 A * | 11/1988 | Nakano et al. ............. | 340/10.3 |
| 5,103,209 A * | 4/1992 | Lizzi et al. ................ | 340/572.4 |
| 5,300,922 A * | 4/1994 | Stoffer ...................... | 340/572.1 |
| 5,613,228 A * | 3/1997 | Tuttle et al. .............. | 455/127.2 |
| 5,778,309 A * | 7/1998 | Tuttle et al. .............. | 455/127.2 |
| 6,101,375 A * | 8/2000 | Tuttle et al. .............. | 455/127.2 |
| 6,292,654 B1 * | 9/2001 | Hessel et al. ................ | 455/223 |
| 6,636,146 B1 * | 10/2003 | Wehoski ..................... | 340/10.4 |
| 6,696,935 B2 * | 2/2004 | Bonardi et al. .............. | 340/447 |
| 6,735,260 B1 * | 5/2004 | Eliezer et al. ............... | 375/316 |
| 7,072,618 B1 * | 7/2006 | Strutt ...................... | 455/67.13 |
| 2005/0226312 A1 * | 10/2005 | Koslar et al. ................ | 375/142 |
| 2006/0022801 A1 * | 2/2006 | Husak et al. ............... | 340/10.5 |
| 2006/0238301 A1 * | 10/2006 | Wu et al. ................... | 340/10.1 |
| 2006/0244598 A1 * | 11/2006 | Hyde et al. ............... | 340/572.1 |

OTHER PUBLICATIONS

Eric Smith et al., "Closed Caption Decoder Theory of Operation", http://www.brouhaha.com/~eric/caption/ccthry5.txt, copyright 1995, 1996, 2003 (Dec. 29, 2003), p. 1-8.
Application Note 3671, Maxim Integrated Products, "Data Slicing Techniques or UHF ASK Receivers", http://www.maxim-ic.com/an3671 copyright 2005, (Oct. 18, 2005), 10 pages.

* cited by examiner

*Primary Examiner*—Daniel Wu
*Assistant Examiner*—Bradley E Thompson
(74) *Attorney, Agent, or Firm*—Caesar, Rivise, Bernstein, Cohen & Pokotilow, Ltd.

(57) ABSTRACT

A radio frequency identification (RFID) tag is provided with a capability to adaptively initiate a floating RF threshold from the level of a raw RF signal detected during a communication session with a designated RFID reader, and to compare that threshold with the level of a baseband signal derived from the RF signal so as to reject RF interference including noise from other sources during the communication session. Preferably, the threshold is derived from the peak level of the detected RF signal on commencement of each communication from the reader during the session.

3 Claims, 6 Drawing Sheets

No noise

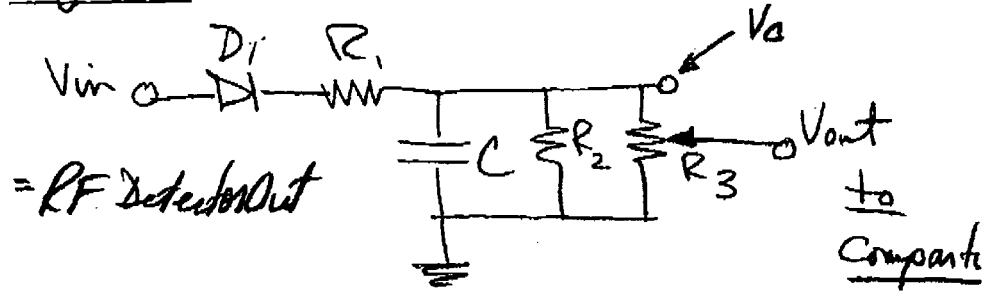
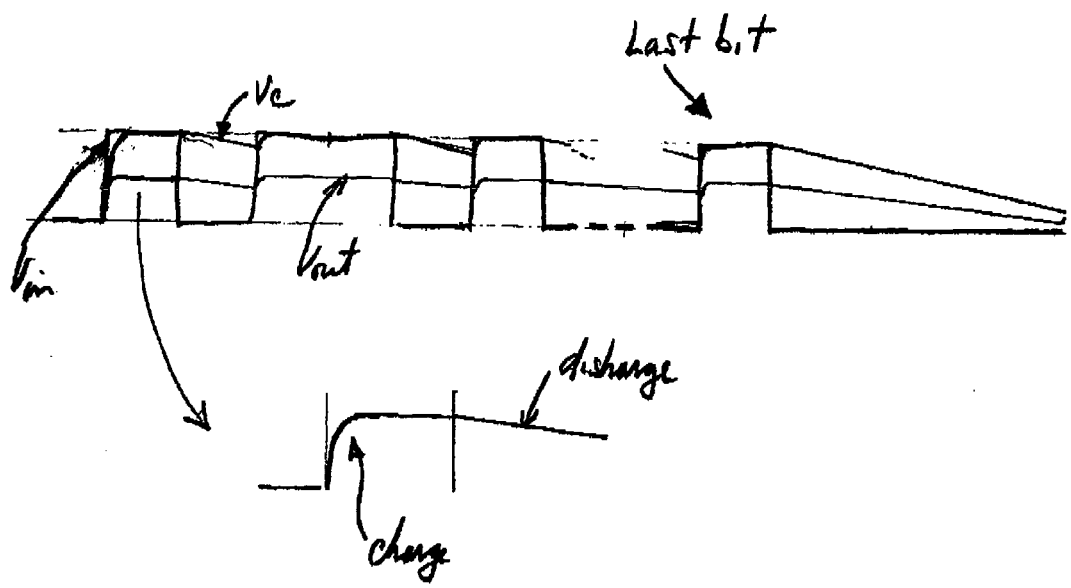

FLOATING THRESHOLD FOR DATA DETECTION IN A RFID TAG

FIELD OF THE INVENTION

The present invention relates generally to radio frequency identification (RFID) systems and methods of operation, and, more particularly, to threshold detection by a RFID tag of an incoming RF signal from a RFID reader with which the tag is communicating, wherein the tag is implemented with a capability to reject signal interference from other RFID readers, or simply the presence of noise, in the vicinity of the tag.

BACKGROUND OF THE INVENTION

In general, RFID systems consist of a tag or multiplicity of tags implemented to provide information such as identity, features, or characteristics of an object or article to which the tag is affixed, and to transmit that information via an RF signal to a RFID reader in response to an RF interrogation signal received by the tag from the reader. In many instances of supply chain tagging applications the tag may be placed on a container (e.g., a carton, a case or a pallet) utilized for holding or storing a multiplicity of common items. In contrast, item-level RFID tagging involves outfitting each individual item with its own RFID tag. The identity of and perhaps other information relating to the tagged article is stored in the tag's memory for transmission to a remote RFID reader, sometimes referred to as an interrogator, in response to a scan (or query, command or interrogation—these terms, for present purposes, meaning substantially the same thing) from the reader when within the response range of the tag.

The response range is any range suitable for enabling an RF communication session to take place between reader and tag. Thus, although the term radio frequency identification, or RFID, may tend to connote a one-way transfer of information from a tagged object to a remote location to reveal the object's ID, RFID systems typically involve two-way communication that is prompted by the reader's scan of the tag with either a continuous wave (CW), usually to evoke a read-only (RO) response by way of acquiring specific data stored in a specific format in the tag, or a modulated (generally amplitude modulated, or AM) RF signal to engage in a read/write (R/W) communication session with the tag.

In its simplest form, a conventional RFID tag consists of an application specific integrated circuit (ASIC) and an antenna. Often, the RFID tag is referred to as a transponder. These small, simple tags are in use in a variety of applications beyond supply-chain tagging, such as tracking movable assets, e.g., as diverse as rail cars and locomotives to cattle and other animals, or by way of on-the-fly collection of tolls assessed upon passage of a moving vehicle equipped with an authorized tag through a highway toll plaza. Another RFID tag application may involve control of access to secure areas of a facility or to entertainment events. A host of other applications may be served where moderate communication distances and moderate data transfer are required, notwithstanding the possible nearby presence of RFID readers other than merely the reader with which an ongoing communication session is intended.

RFID tags may be either passive or active. A passive RFID tag lacks an internal self-sufficient power supply, e.g., a battery, and relies instead on the incoming RF query by the reader to produce sufficient power in the tag's internal circuitry to enable the tag to transmit a response. In essence, the query induces a small electrical current in the tag's antenna circuitry, which serves as the power source that enables tag operation. Typically, the range of passive tags is more limited than that of active tags.

But the absence of a battery leads to certain advantages, primarily that a passive tag can have virtually unlimited life and be fabricated at much less cost and in considerably smaller size than an active tag, thus serving an important need to improve the efficiency and accuracy of tracking systems for commerce, security and defense. With costs of production trending downward, passive RFID tags could soon replace the ubiquitous universal product code (UPC) for many applications, the bar code strip found on myriad products and product containers in the stream of commerce. Unlike RFID, the imprinted bar code strip requires a line of sight optical scan to produce the UPC readout and the resulting computerized display or printout of price (at a point of sale of the bar-coded product) and other information regarding the product.

Although its on-board battery can provide the active RFID tag with greater dynamic range, higher data rates and additional functions that require a constant supply of power vis-à-vis the passive tag, and the battery itself may be quite small, the disadvantages of limited life, greater cost and size relative to the passive tag may weigh against the use of an active tag in certain applications.

The principles of the present invention are applicable to both passive and active RFID tags.

RFID tags may operate as read-only devices, capable of transmitting only fixed, invariable information stored in the tag memory of the semiconductor integrated circuit (IC) chip in which the tag is fabricated, as the readout when the tag is scanned by the reader in an RF communication between reader and tag. RFID tags may also be readable/writable devices adapted to allow their memories to be read and/or overwritten by a reader during a communication session. Data stored in memory (e.g., electrically-erasable programmable read-only memory, or EEPROM), whether original, overwritten or new, is available for transmittal to the reader on receipt by the read/write RFID tag of an appropriate command. Tag memory may contain both a read only portion and a read/write portion.

The form of communication known as modulated backscatter typically used by passive tags is a decades-old technique. Tags that communicate in this way can be very low power, with operational distances as great as tens of meters for radio signals in the ultra high frequency (UHF) or microwave bands.

Generally, the RFID tag is implemented in an ASIC chip fabricated, for example, using CMOS (complementary metal oxide silicon) process technology. The tag's electronics are integrated into the chip, sometimes referred to as a radio frequency IC, or RFIC, together with an antenna on the same substrate. The custom IC of which the RFIC or ASIC is comprised may include a voltage-doubler, analog and digital circuitry of the transponder, and memory capacity to store a software program as well as data to be transmitted to the reader in response to a command, plus other electronics as may be necessary for a particular RFID design.

A typical conventional RFID tag reader employs a transceiver, a control unit and an antenna for communicating with (e.g., interrogating or commanding) the tag at a designated RF frequency among several allocated for this purpose.

In the specific example of a RFID system in which a reader (interrogator) and a tag (transponder) are used to complete transactions in moderate to high speed applications such as toll collection transactions by the aforementioned identification of tagged authorized vehicles passing the reader in designated lanes of a toll plaza at or near highway speed (i.e. non-stop), the system may be impacted by the presence of multiple readers.

RFID tag ASICs operate with fixed RF thresholds that must be surpassed by the incoming RF signal (incident on the RFID tag's antenna) in order to present the tag's digital logic with an appropriate control bit, either a "1" or a "0." This fixed threshold setting effectively limits rejection of RF interference encountered by the tag in an application where multiple readers may be present or in the vicinity of the tag, to a specific RF level. In essence, the limited rejection prevents the tag's data detector circuit from detecting a low RF level from a reader with which an RF communication session is intended to take place, if an interfering source (e.g. another reader's RF transmission) has exceeded the fixed threshold setting.

For example, RFID systems toll collection applications require an operating zone of 10 feet or more in the traveling direction, and exceeding the width of a roadway lane. This operating zone, often referred to as the "footprint" for reliable on-the-fly toll collection, is a range for RF communications to take place between reader and tag, outside of which communications may be spotty or unreliable. The footprint is one of the determining factors in a RFID system toward attaining reliable multiple transactions between a reader and a tag or tags within that zone.

In this footprint, the RF level increases by 20 db or more from a wake-up level, which is the RF level at which the tag first starts to respond. If the interference level reaches the fixed threshold anywhere in the footprint, the tag is no longer able to decode the reader's commands. It is not unusual for the interference to increase as the tag moves closer to the reader in a multi-lane configuration, such as at a toll plaza with two or more lanes devoted to on-the-fly toll collection of tagged vehicles, since overlapping antennas and readers are present to provide all toll lanes with adequate coverage. Consequently, readers in adjacent lanes act as sources of interfering RF transmissions depending upon the lane in which the tag is located.

FIG. 1 is a block diagram of the receiver input section of a typical prior art RFID tag. The RF signal transmitted by a reader encountered by the tag is incident on the tag's antenna 12. The RF input is an on-off signal, depicted as "RF in" in FIG. 2A, one in a sequence of waveform diagrams of FIG. 2 illustrating operation of the receiver input section of the RFID tag of FIG. 1. It will be observed that the RF in signal is relatively clean, which is the ideal case where noise or other signal interference is absent at the tag's antenna 12. The "RF in" signal is applied to an RF Detector 15, which converts that on-off RF signal to an analog baseband signal, depicted as "RF Detector out" in FIG. 2B. In fact, the latter signal may (and typically would) include an on-off component of variable amplitude and also interference and other readers' signals. Hence, despite its appearance in FIG. 2B, it is analog, not a true digital signal.

The "RF detector out" signal is fed into a Data Detector, or Comparator 17, which receives as a second input a fixed threshold level (FIG. 2C), referred to as the Trip Point, from a Threshold Generator 19. Thus, the Data Detector 17 is presented with the two inputs consisting of the baseband signal ("RF Detector out") and the fixed threshold level (Trip Point) as shown in FIG. 2D, for comparison. When the baseband signal level exceeds the fixed threshold level, the output of Data Detector 17 is asserted and results in generation of the digital data depicted as "Comparator out" in FIG. 2E.

In situations when noise or other RF interference is present at antenna 12 along with the RF signal from an authorized RFID reader seeking to enter into a communication session with the tag, however, the resulting output of Data Detector 17 may be corrupted to an extent that precludes entry into the desired session. And this may be the result even where the noise or other signal interference is at a relatively low level. That type of situation is illustrated in the sequence of waveform diagrams of FIGS. 3A-3D. Here, the "RF in" signal (FIG. 3A) at the antenna 12 (FIG. 1) has a noise component 20. Accordingly, the output signal ("RF Detector out," FIG. 3B) of RF Detector 15 resulting from the conversion of "RF in" also shows a presence of noise or interference spikes 22. To the extent that any of these spikes 22 exceed the fixed threshold level 25 (FIG. 3C), in the comparison of levels of the two signals by Data Detector 17, the digital output of the Data Detector is similarly fraught with errors, as illustrated by the inappropriate digital peaks 26 in the waveform diagram of FIG. 3D that are coincident with the excessive spikes.

It is essential that RFID systems operate with great accuracy and reliability, particularly in applications where transactions between RFID readers and tags are occurring at high speed. Any problems that may occur in reading the tags that participate in such transactions, as in an on-the-fly toll collection application, for example, directly affect the Toll Authority's revenue, making it imperative to resolve such problems in a manner that will result in reliable and consistent performance by the system.

SUMMARY OF THE INVENTION

It would be desirable to provide a RFID tag that possesses a capability to vary, and more particularly to increase, its RF threshold level in various situations or circumstances—such as the one mentioned immediately above. In the latter scenario, RF interference at a fixed lower threshold level designated to recognize control bits begins to affect the adjacent passage of tagged objects. This can occur, for example, where vehicles authorized by means of RFID tags to participate in the automated highway toll collection suffer interference from RFID readers in adjacent lanes—so that the increased threshold level concomitantly increases the overall RFID system margin.

It is a principal object of the present invention to provide a RFID tag having a variable, or floating threshold level for use in comparison against the RF input signal level to the tag.

A more focused object of the invention is to provide a tag with such a threshold based on the peak level of the RF input signal to the tag.

A related object of the invention is to provide a RFID tag that is adapted to communicate with a principal reader and to selectively reject RF signal interference from other RFID readers in the vicinity of the tag.

Still another object of the invention is to provide RF tags and methods of RF tag operation that enable the tag to adaptively institute a floating threshold for data detection in an RF communications session.

According to the invention, a RFID tag is implemented to adaptively initiate a floating threshold to enable the ASIC to track the RF level, preferably but not necessarily the peak level, of the signal received at the tag's antenna from the RFID reader with which it is engaged, or sought to be engaged, in a communication session, and thereby provide substantially complete rejection of interference from noise or extraneous signals, whether continuous wave (CW) and/or modulated (e.g., amplitude modulated (AM)), emanating from other sources in or in proximity to the RF response range of the tag.

According to one aspect of the invention, a RFID tag comprises an ASIC for adaptively initiating a floating threshold that tracks the RF level of the signal from a designated RFID reader when the tag is engaged in an RF communications session with the reader, and for comparing the floating RF threshold with the raw signal detected from the reader to substantially remove RF interference from other sources on the raw detected signal.

In a preferred embodiment, the floating threshold is derived from the peak RF level on the raw detected signal including the interference. In another embodiment, the floating threshold is derived from the average level of segments of the on the raw detected RF signal including the interference, over a selected interval of time.

In a method of radio frequency identification for a communication session between a tag and a reader, the tag adaptively initiates a floating threshold that tracks the RF level of the raw signal detected from the reader including RF interference from other sources during the session, and the detected raw signal is compared with the threshold to reject the RF interference.

BRIEF DESCRIPTION OF THE DRAWINGS

The above and still further objects, features, aspects and advantages of the invention will be more clearly understood by those skilled in the art from a consideration of the following detailed description of the best mode presently contemplated for implementing the principles of the invention, in conjunction with the accompanying drawing, in which:

FIG. 6 is a circuit diagram of a peak signal detector;

FIG. 7 is a timing diagram showing the threshold level for the peak detector of FIG. 6;

DETAILED DESCRIPTION OF THE INVENTION

Figure 1:
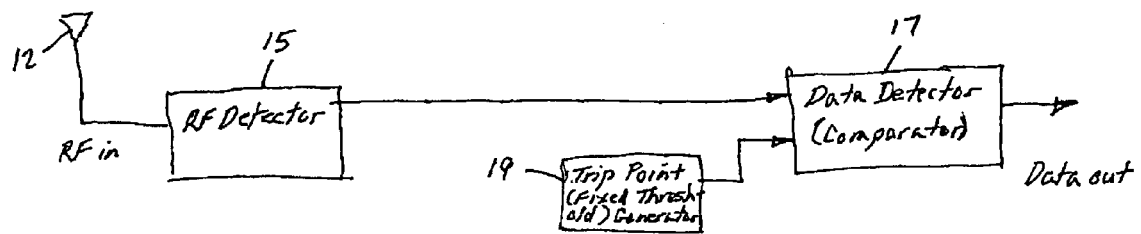
FIG. 1 is a is a block diagram of the receiver input section of a typical prior art RFID tag, described above in the Background section of this document.

In describing a preferred embodiment of the invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or similar result.

Figure 4:
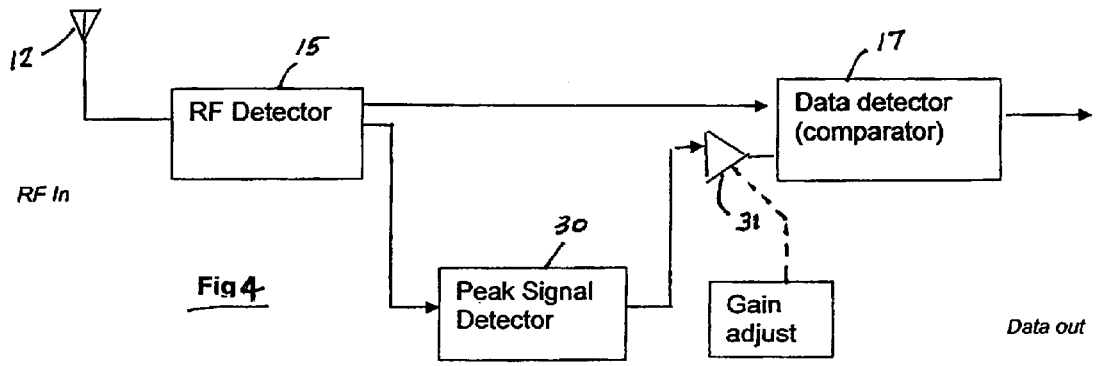
FIG. 4 is a block diagram of the receiver input section of a presently preferred embodiment of a RFID tag implemented in accordance with the principles of the present invention.
Figure 2:
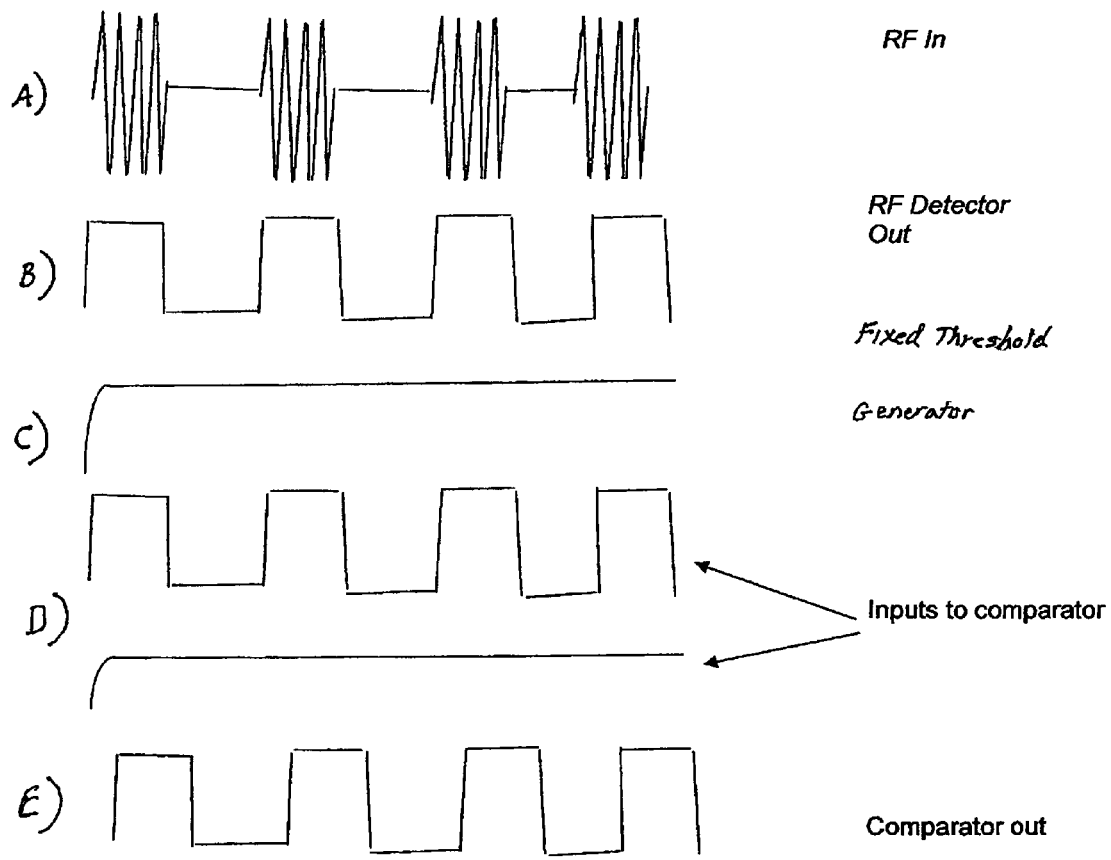
FIGS. 2A-2E is a sequence of waveform diagrams illustrating operation of the receiver input section of the RFID tag of FIG. 1 upon receipt of an RF input from a RFID reader in the absence of noise or other signal interference, also described in the Background section.
Figure 3:
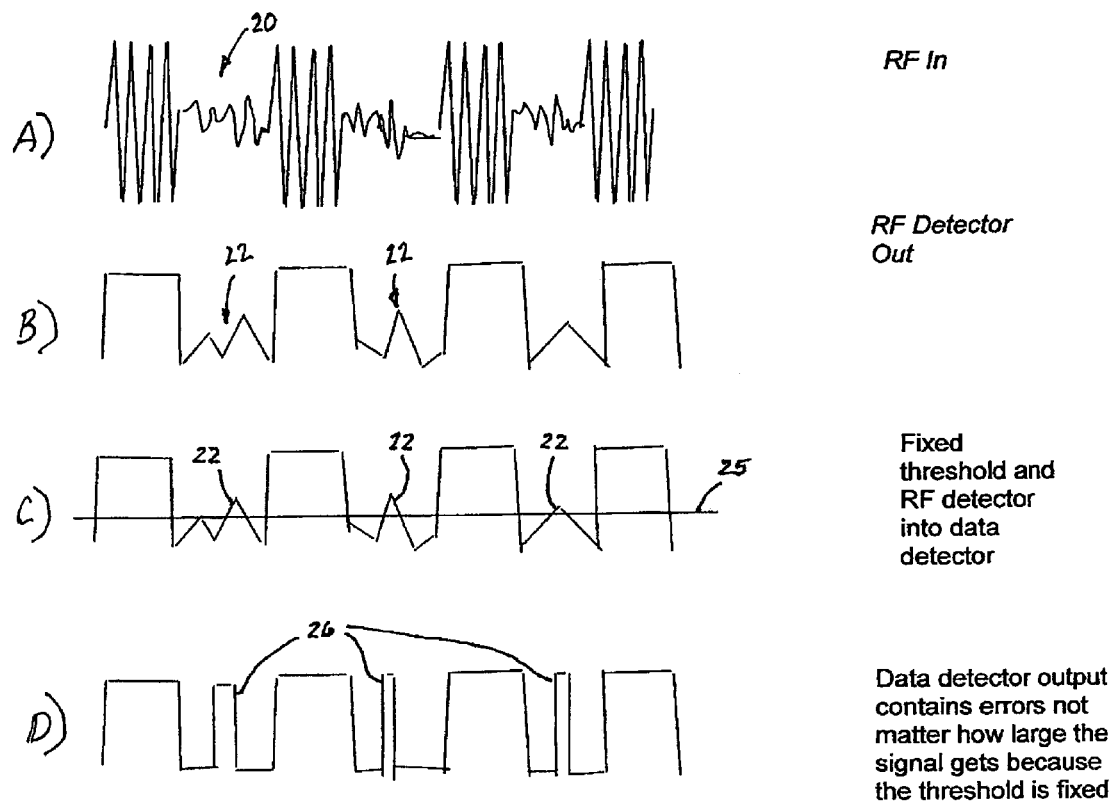
FIGS. 3A-3D is a sequence of waveform diagrams illustrating operation of the receiver input section of the RFID tag of FIG. 1 upon receipt of an RF input from a RFID reader in the presence of noise or other signal interference, also described in the Background section.

Referring now to FIG. 4, a presently preferred embodiment of a RFID tag implemented in accordance with the principles of the present invention will be described in terms of the block diagrammatic structure of the tag's receiver input section illustrated therein. Common components and features in the various figures, including those described in the Background section above, are designated by the same reference numbers. It will be observed that the receiver input section of FIG. 1 differs from that of FIG. 4 in the absence of a fixed threshold setter and the inclusion of a Peak Signal Detector 30 and a gain adjustable amplifier 31 in the receiver input section between the output of RF Detector 15 and an applicable one of the two comparison inputs of Comparator 17. These specific components of the improved receiver input section of FIG. 4 according to the principles of the present invention are shown by way of example and not as limitations of the invention. The gain of amplifier 31 is selected to scale the input to Comparator 17 at a suitable level which is only a fraction of the peak amplitude.

Figure 5:
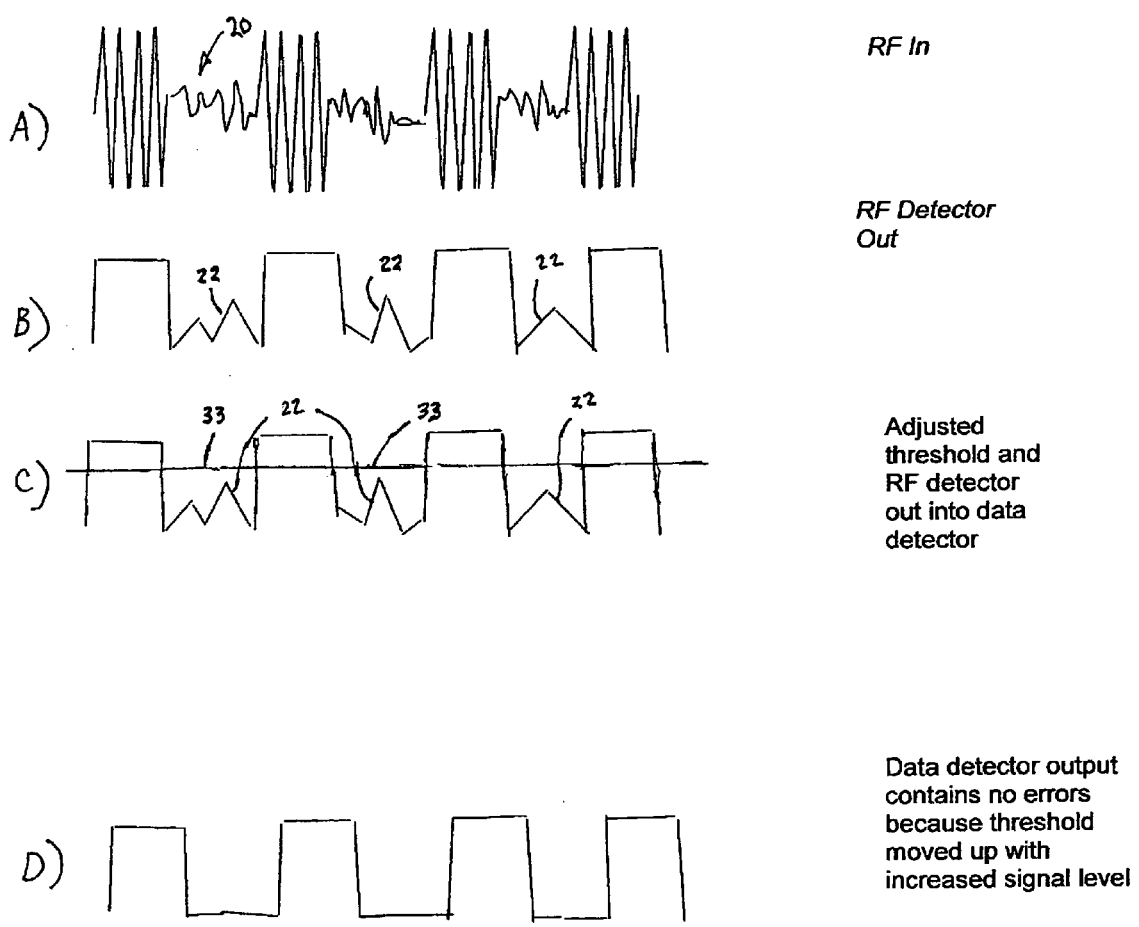
FIGS. 5A-5D is a sequence of waveform diagrams illustrating the improved operation of the receiver input section of the RFID tag of FIG. 4 upon receipt of an RF input from a RFID reader in the presence of noise or other signal interference.

Referring now to FIG. 5, in operation of a RFID tag with the input section of FIG. 4, an "RF in" signal (FIG. 5A) received at antenna 12 has a noise component 20. The raw "RF in" signal is applied to RF Detector 15, which converts it to an analog baseband signal ("RF Detector out", FIG. 5B) in a manner corresponding to operation of the RFD tag of FIG. 1.

Here, however, Peak Signal Detector 30 is provided in the system to monitor and detect the peak of the "RF Detector out" signal, so that the threshold or trip signal used in the comparison stage adapts to or floats with the peak of the "RF Detector out" signal accordingly, to nullify the presence of noise or other RF interference during performance of the comparison, as shown in FIG. 5C. The peak detector responds very rapidly to the first pulse received in the "RF Detector out" signal, the amplitude of which is heightened by the presence of the interference. This initial detected peak will remain as the threshold for a relatively long period during the signal processing, typically sufficient to accommodate the length of each respective received communication from the designated reader during the communication session.

Thus, the Comparator 17 is provided with an adaptive, or floating, threshold that serves to reject or eliminate the noise or interference spikes 22 in the "RF Detector out" signal of FIG. 5B. The interference rejection is accomplished during the comparison of the "RF Detector out" signal with the floating threshold 33 (FIG. 5C). The threshold level 33 generated by Peak Signal Detector 30 will change with variations in the "RF Detector out" signal attributable to the noise or other interference perturbations at the outset of each communication from the reader detected by RF Detector 15, and is applied as the input adaptive threshold to Comparator 17. As noted above, amplifier 31 is used to scale the threshold level input to the Comparator 17 at only a fraction of the peak amplitude.

Accordingly, the spikes 22 cannot exceed the floating threshold level 33 (FIG. 5C), in the comparison of levels of the two signals by Comparator 17. The digital output of the comparator contains no errors (FIG. 5D), because the adaptive threshold 33 tracks the heightened signal level of the "RF in" signal to the receiving section at the commencement of each communication from the reader, and the comparison process results in retention of only the signal components that exceed the respective threshold for that communication. This constitutes a rejection of the interference signal portions at the "data out" output of Comparator 17.

Ideally, the threshold is set at about one-half of the peak value to provide a sufficient noise margin. In addition, a lower bound can be provided so that the threshold is not so low that the absence of an "RF in" signal does not result in a "RF Detector Out" signal. The peak detector 30 continuously samples the peak level and revises the threshold accordingly. The peak detector preferably charges up to the maximum value of the input signal very quickly and retains this value until a prescribed time is elapsed. The discharge time is set so that the peak detector drops the level slowly over time. In accordance with the preferred embodiment, the discharge time is based on the time between expected messages. For instance, if reader sends messages every second, the peak detector is set to discharge in 0.25 seconds.

Further to the preferred embodiment, the peak detector 30 is configured as shown in FIG. 6. Here, the resistor R1 and the capacitor C set the charge time constant and resistor R2 and the capacitor C set the discharge time constant. Potentiometer R3 is used as a gain adjust 31 for the comparator stage. It is set so that the reference level of the comparator is one-half of the peak value. Resistor R2 should be much greater than resistor R1 so that the discharge time is much longer than the charge time. Resistor R3 should be much greater than resistor R2 so that resistor R3 does not affect the discharge or charge times. The threshold value is set on the first bit.

When $V_{in}$ is greater than $V_c$, current flows through the diode D1 through resistor R1 into capacitor C because the diode is forward biased. Because resistor R1 is small, capacitor C quickly charges close to the applied voltage level (FIG. 7) and relatively little current flows through resistors R2 and R3 because they are much larger than resistor R2. When $V_{in}$ is less than $V_c$, no current flows through diode D1 because it is reverse biased. A small amount of current does flow from the capacitor C through resistor R2. The capacitor retains its charge and voltage, but discharges slowly. Resistors R1 and R2 are set to allow the peak detector to very quickly rise to the peak value of the RF detector out signal and slowly drop to zero after the message is received, but before the next message is started. Resistor R3 can be used to set the threshold to the comparator and nominally would be set so that approximately one-half of the peak value of the RF detector voltage is applied to the capacitor. However, it should be appreciated that the threshold can be set at any suitable level other than one-half of the peak value.

Depending on the communication protocol, an averaging circuit could be used to move the threshold up and down with each of the bits detected in each raw communication from the reader over a selected interval of time, so that the threshold would float with the average level of bits detected over the selected interval, rather than the peak at the start of each communication of multiple bits from the reader. However, while such a circuit is within the contemplation of the present invention, it is less preferred than the embodiment described above, owing to disadvantages of slower operation and a requirement of "training" bits as part of the protocol.

Figure 8:
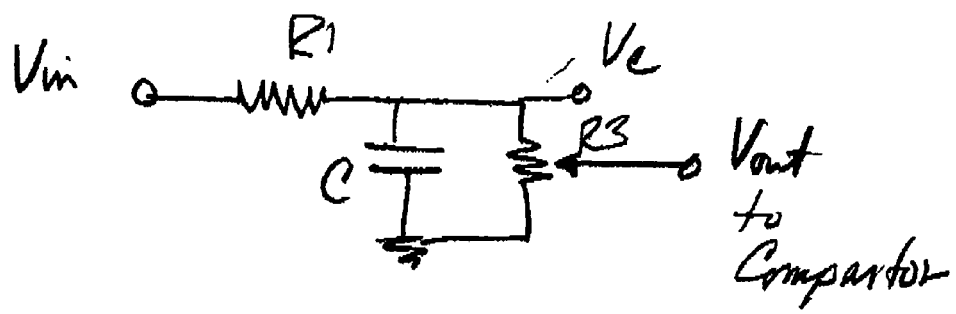
FIG. 8 is a circuit diagram of an averaging circuit.
Figure 9:
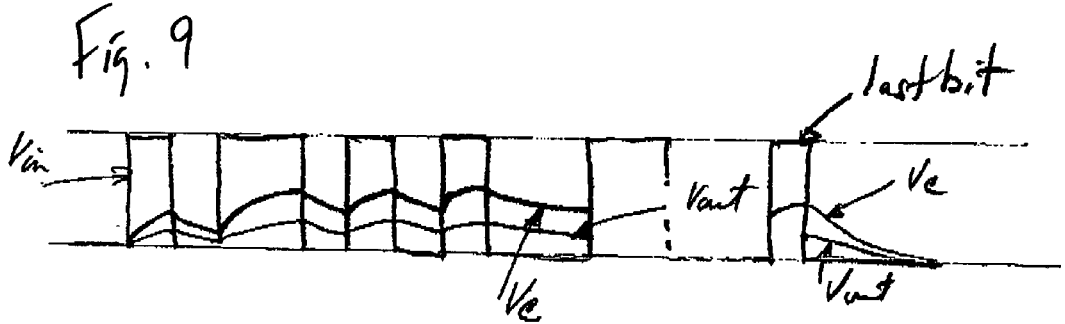
FIG. 9 is a timing diagram showing the threshold level for the averaging circuit of FIG. 8.

An averaging circuit is shown, for instance, in FIG. 8 to provide a moving average value based on a fixed period of time, as reflected in FIG. 9. The averaging circuit operates as a low pass filter to provide an exponentially weighted average. The initial start up time (i.e., the time it takes to reach the average) may result in the first few bits of the message being lost, so that the averaging circuit is best suited to applications where the initial start up time is not critical. In this embodiment, the resistor R3 is selected to be much greater than resistor R1 so that it does not affect timing. The charge and discharge time constants are the same and are set by resistor R1 and capacitor C. Capacitor C is charged at a rate determined by resistor R1 and capacitor C when $V_{in}$ (RF detector out) is greater than $V_c$. Capacitor C is discharged at a rate determined by R1 and C when $V_{in}$ (RF detector out) is less than $V_c$. The RC charge/discharge time constant effectively averages out the signal. The average value produced by this circuit is one-half of the peak value and can be used directly in the comparator. The potentiometer allows for a further reduction in this voltage if required.

The foregoing description and drawings is merely illustrative of the principles of the invention. The invention may be configured in a variety of ways and is not intended to be limited by the preferred embodiments or methods. Numerous applications of the invention will readily occur to those skilled in the art from a consideration of the foregoing description. For instance, the peak detector and averaging circuit can be implemented by a wide variety of circuits other than those shown and described. Therefore, it is desired that the invention not be limited to the specific examples disclosed or the construction and operation shown and described. Rather, all suitable modifications and equivalents may be resorted to, falling within the scope of the invention.

What is claimed is:

1. A RFID tag comprising
    a receiver input section for processing signals from a RFID reader, said receiver input section including an RF detector for converting signals received from a designated RFID reader to a baseband signal, including corrupted baseband signal segments attributable to noise or other RF interference on the received signal,
    a data comparator for comparing the level of said baseband signal including any said corrupted baseband signal segments to a threshold level and for generating a data output representing portions of said baseband signal exceeding said threshold level,
    a processor responsive to the baseband signal for tracking its signal level including the level of said corrupted baseband signal segments and for generating an adaptive level as said threshold level for said comparison, whereby to produce a comparator data output substantially free from said corruption, and
    wherein said processor includes a peak signal detector and an amplifier with selectively adjustable gain for scaling the peak signal detected by said peak signal detector as said threshold level for said comparison.

2. The RFID tag of claim 1, wherein said processor includes an averaging circuit for tracking variations in the level of said baseband signal over selected intervals of time.

3. The RFID tag of claim 2, wherein said processor includes an amplifier with selectively adjustable gain for scaling the tracked variations of said baseband signal level as said threshold level for said comparison.

* * * * *